(12) United States Patent
Elias

(10) Patent No.: US 10,788,160 B2
(45) Date of Patent: Sep. 29, 2020

(54) UTILITY ARM

(71) Applicant: James Elias, Rosenheim (DE)

(72) Inventor: James Elias, Rosenheim (DE)

(73) Assignee: Andrew Subratie, Surrey (GB)

( * ) Notice: Subject to any disclaimer, the term of this patent is extended or adjusted under 35 U.S.C. 154(b) by 0 days.

(21) Appl. No.: 15/469,059

(22) Filed: Mar. 24, 2017

(65) Prior Publication Data

US 2017/0276291 A1 Sep. 28, 2017

(30) Foreign Application Priority Data

Mar. 26, 2016 (GB) .................................. 1605150.0

(51) Int. Cl.
*F16M 13/02* (2006.01)
*F16M 11/14* (2006.01)
(Continued)

(52) U.S. Cl.
CPC ............ *F16M 13/02* (2013.01); *F16M 11/14* (2013.01); *F16M 11/2021* (2013.01);
(Continued)

(58) Field of Classification Search
CPC ............ F16M 2200/022; F16M 11/14; F16M 11/2078; F16M 11/2021; F16M 2200/02; F16M 2200/021; F16M 2200/06; F16M 13/00; F16M 13/02; Y10T 403/32024; Y10T 403/32032; Y10T 403/32254; Y10T 403/32262; Y10T 403/32311; Y10T 403/32008; Y10T 403/32065;
(Continued)

(56) References Cited

U.S. PATENT DOCUMENTS 3,240,516 A * 3/1966 Barish .................... A61G 13/12
248/284.1
3,367,616 A * 2/1968 Bausch .................... B60R 1/04
248/483

(Continued)

*Primary Examiner* — Ingrid M Weinhold
(74) *Attorney, Agent, or Firm* — Fay Sharpe LLP

(57) ABSTRACT

A utility arm includes a first arm, terminating in first universal joint, locked by a first piston, and a second arm, terminating in second universal joint, locked by a second piston. These are joined by an intermediate joint positioned between the first universal joint and second universal joint, and there is a locking means on the intermediate joint. The intermediate joint has a first housing, with a first pressure piece having an inclined surface which abuts the first piston, the first pressure piece having a conical or frustoconical surface a second housing, with a second pressure piece having an inclined surface which abuts the second piston, the second pressure piece having a conical or frustoconical surface. The first pressure piece and second pressure piece interlocks with corresponding conical or frustoconical surfaces, so that pressure exerted by the locking means presses the first pressure piece and second pressure piece together, such that the inclined surface of the first pressure piece acts on the first piston to lock the first universal joint, the inclined surface of the second pressure piece acts on the second piston to lock the second universal joint, and the corresponding conical or frustoconical surfaces lock the intermediate joint.

6 Claims, 9 Drawing Sheets

(51) Int. Cl.
*F16M 13/00* (2006.01)
*F16M 11/20* (2006.01)

(52) U.S. Cl.
CPC ........ *F16M 11/2078* (2013.01); *F16M 13/00* (2013.01); *F16M 2200/022* (2013.01); *F16M 2200/06* (2013.01); *Y10T 403/32024* (2015.01)

(58) Field of Classification Search
CPC ............... Y10T 403/36; Y10T 403/362; Y10T 403/364; Y10T 403/366; Y10T 403/368; F16C 11/106; F16C 11/10; F16C 11/06; F16C 11/0695
USPC ........... 403/55, 56, 92–93; 248/274.1, 276.1, 248/282.1, 284.1
See application file for complete search history.

(56) References Cited

U.S. PATENT DOCUMENTS

| | | | | |
|---|---|---|---|---|
| 3,910,538 A | * | 10/1975 | Baitella | F16M 11/14 248/124.1 |
| 4,236,844 A | * | 12/1980 | Mantele | F16M 11/14 248/276.1 |
| 4,320,884 A | * | 3/1982 | Leo | F16M 11/14 248/181.1 |
| 4,402,481 A | * | 9/1983 | Sasaki | F16M 11/12 248/282.1 |
| 4,431,329 A | * | 2/1984 | Baitelle | A61B 17/02 248/276.1 |
| 4,491,435 A | * | 1/1985 | Meier | F16M 11/14 248/276.1 |
| 4,606,522 A | * | 8/1986 | Heifetz | F16C 11/06 248/276.1 |
| 4,949,707 A | * | 8/1990 | LeVahn | A61B 17/0206 600/228 |
| 5,092,551 A | * | 3/1992 | Meier | F16M 11/14 248/276.1 |
| 6,352,227 B1 | * | 3/2002 | Hathaway | F16M 11/14 248/160 |
| 6,575,653 B1 | * | 6/2003 | Krauter | A61G 13/101 248/276.1 |
| 7,993,069 B2 | * | 8/2011 | Persson | B60R 11/0252 248/288.51 |

* cited by examiner

PRIOR ART

UTILITY ARM

CROSS-REFERENCE TO RELATED APPLICATIONS

This application claims priority to and the benefit of Great Britain Patent Application No. GB1605150.0, filed Mar. 26, 2016, the entirety of which is hereby incorporated by reference as if fully set forth herein.

The present specification relates to a utility arm, that is, an articulated linkage whose links can be oriented and the resulting orientation fixed.

Utility arms are often used to hold equipment in a fixed position relative to other equipment. For example, a utility arm may be attached to a camera at one end while the other end holds a video monitor. The monitor can be conveniently positioned by manipulating the utility arm until the monitor is in the desired location relative to the camera, and then locking the shape of the utility arm.

A common arrangement of a utility arm 10 is shown in FIG. 1a. A first arm 12 is linked to a second arm 14 by a pivoting joint 15. The distal end ('distal' and 'proximal' are used relative to the pivoting joint 15) of the first arm 12 is attached to an attachment stud 16 by a first ball and socket joint 18. The thread on the attachment stud 16 allows the arm to be secured to some equipment such as a movie camera (not shown) by screwing the attachment stud 16 into a threaded bore provided on the movie camera. The ball and socket joint 18 permits a wide range of pivoting of the first arm 12, often allowing the pivoting joint 15 to describe at least a hemisphere centred on the ball and socket joint 18, as well as permitting the first arm 12 to rotate around its longitudinal axis.

The distal end of the second arm 14 is similarly attached via a ball and socket joint 19 and attachment stud 17 to a monitor 20. Again, the ball and socket joint 19 permits the monitor to pivot relative to the second arm 14 around a solid angle of a spherical cap, depending on the arrangement of the ball and socket joint 19, as well as permitting the monitor to be rotated about the longitudinal axis of the attachment stud 17.

The pivoting joint 15 allows the first arm 12 and second arm 14 to pivot in the plane of the pivoting joint 15. With this articulation the monitor can be positioned at many different points within the volume of hemisphere (or some other portion of a sphere), and can also be freely oriented.

The positions of the first arm 12 and second arm 14 are fixed by an operating knob 22. Tightening of the operating knob 22 causes internal pistons in the first arm 12 and second arm 14 to move distally and bear against the two ball and socket joints 18, 19. Loosening the operating knob 22 causes the pistons to move proximally and release the two ball and socket joints 18, 19 Tightening and loosening the operating knob 22 also respectively locks and releases the pivoting joint 15. To change the position and orientation of the monitor 20, the user loosens the operating knob 22, repositions the monitor 20, and tightens the operating knob 22.

A typical system for the pivoting joint 15 is shown in FIG. 2. The operating knob 22 is mounted on a threaded central bolt 24. Also mounted on the central bolt 24 are an upper conical pressure disc 26 and lower conical pressure disc 27, arranged so that their conical surfaces face each other. The first arm 12 comprises an arm housing 35 along which a first piston 29 extends. The proximal end of the first piston 29 has a chamfered surface 32 against which the conical surface of the upper conical pressure disc 26 bears against. As the operating knob 22 is turned to tighten the pivoting joint 15, the upper conical pressure disc 26 is pushed down the central bolt 24, so that conical surface of the upper conical pressure disc 26 urges the first arm 12 distally outwards.

At the ball and socket joint 18, the distal end of the first piston 29 has a conical notch 38 which bears against ball 40, increasing the static friction between the ball 40 and the first piston 29 to fix the position of the ball and socket joint 18.

The proximal end of the second piston 30 also has a chamfered surface 33, and as the operating knob 22 is tightened, a thickened portion on the lower end of the central bolt 24 raises the lower conical pressure disc 27 to bear against this and force the second piston 30 proximally outwards along the second arm 14. The distal end of the second arm 14 features a conical notch 39 which presses against the ball 41, fixing the ball and socket joint 19 in the same manner. The upper conical pressure disc 26 and lower conical pressure disc 27 are separated by a flat washer 37. As the two conical pressure discs 27, 28 come together, they clamp the flat washer 37 and fix the pivoting joint 15.

However, this design has a number of drawbacks;
the solely axial nature of the pivoting joint clamp contact makes it inefficient and prone to slip under load.
the line of contact between the conical pressure disks and the flats on the pistons is nearly coplanar with the piston axis; this line is thus prone to wear under repeated use;
in order to make certain that the system releases upon loosening the operating knob, a relatively flat cone angle is used for the pressure disks. The slope of the actuation curve relative to the screw thread is thus very steep, making the mechanism highly sensitive to wear.
there is no explicit range of usable tension, since the amount of tension depends on the elastic deformation of the threads and parts. As such, applications where full clamping force is not desired (e.g. being able to use the utility arm as an adjustable swivelling unit) are not well-provided for; forcing movement with the arm clamped will cause undue wear.
the different joints may experience different forces, leading to one joint failing while the others are firmly clamped. Also, one joint (often the middle joint) may have a weaker clamping force than the others.

This last point is illustrated in FIGS. 1b, and 1c. The torque on a given joint is proportional to its distance from the exerted force, that is, referring to FIG. 1b, the torque on each joint 18, 15, 19 it is proportional to the respective distances RJ1, RJ2, RJ3 from joints 18, 15, 19 to the payload 20. Since the distance RJ1 is greater than RJ2, which is in turn greater than RJ3, if the joints are similar as regards torque resistance, the first ball and socket joint 18 is more likely to give way while the second ball and socket joint 19 and the pivoting joint 15 remain rigid, causing an undesirable tilting of the payload 20 when subjected to force F.

Referring to FIG. 1c, in some designs, the middle pivot joint 15 is substantially weaker than the ball joints (due to the internal design of the joint, which is often based solely on the axial contact between flat surfaces of the internal components), it will be the pivot joint which then gives way, with the same undesirable tilting of payload under force F.

Both these circumstances can lead to one joint failing even when the system's joints are fully tightened, so that the payload tilts of falls.

It will also be seen that as a consequence of the lack of explicit range of usable tension of the arm, in order to reposition the payload, it is necessary to loosen and retighten the operating knob 22 with one hand, while the weight and position of the payload is supported (at least at its initial and final positions) by the other one hand alone until the utility arm is again locked, making adjustment inconvenient.

Many arrangements of pivoting joint have been provided, but they all share some of these drawbacks.

The present invention aims to provide a utility arm that is convenient to use and which reduces these shortcomings.

According to the present invention, there is provided a utility arm according to the independent claims.

The term locking when applied to a joint means an increasing in torque resistance of the joint. Depending on the context, it may mean that the joint can no longer easily be moved, or it may mean that the joint is stable under the weight of a payload. However, the locking comes about from increased pressure/friction, which may be continuously varied, so the joints may be locked to different degrees as the pressure/friction is varied.

The invention will now be described, by way of example, with reference to the drawings, of which FIG. 1a is a perspective view of a known utility arm;

Figure 1A:
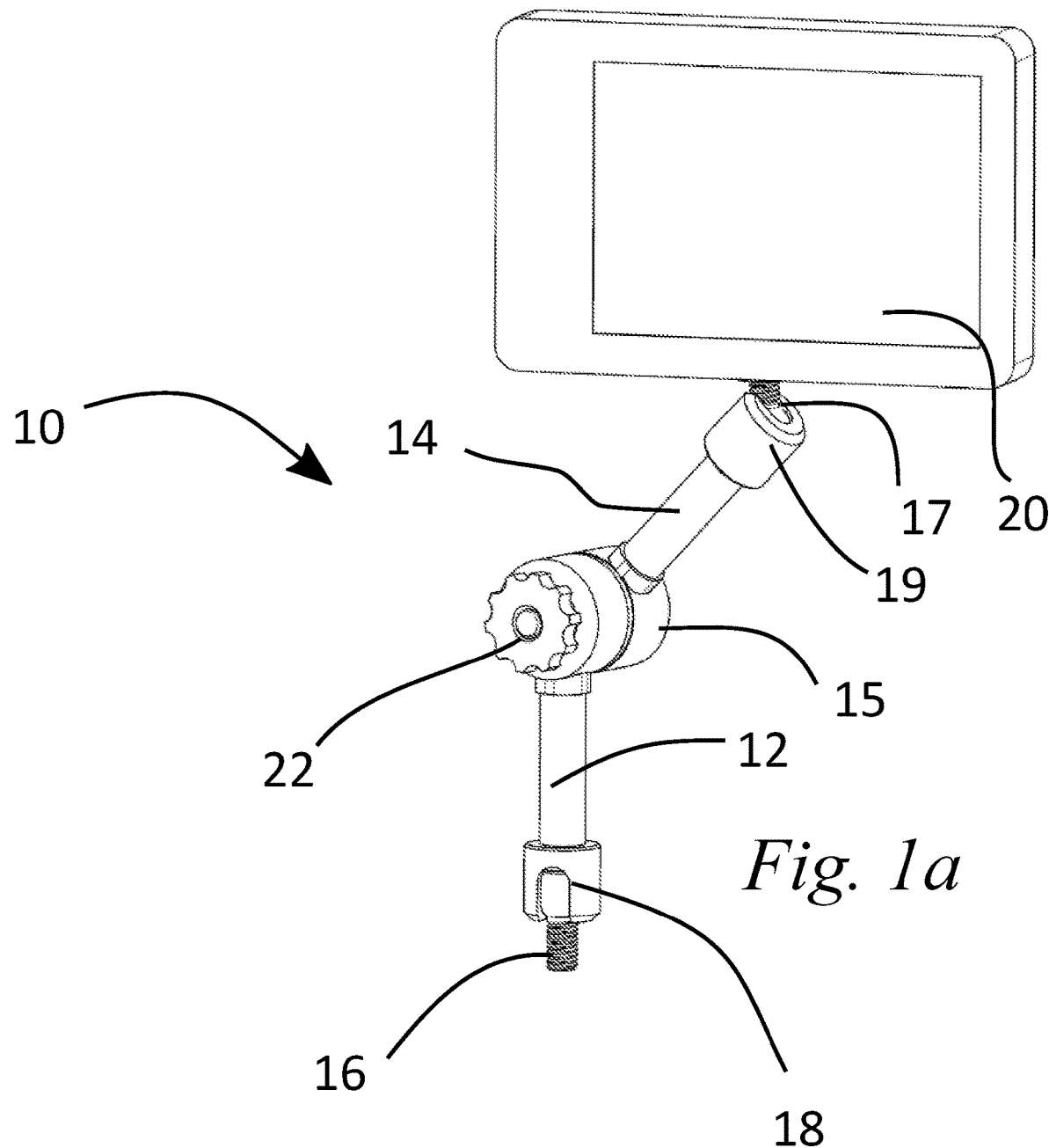
FIG. 1b and 1c are perspective views of known utility arms in use.
Figure 1C:
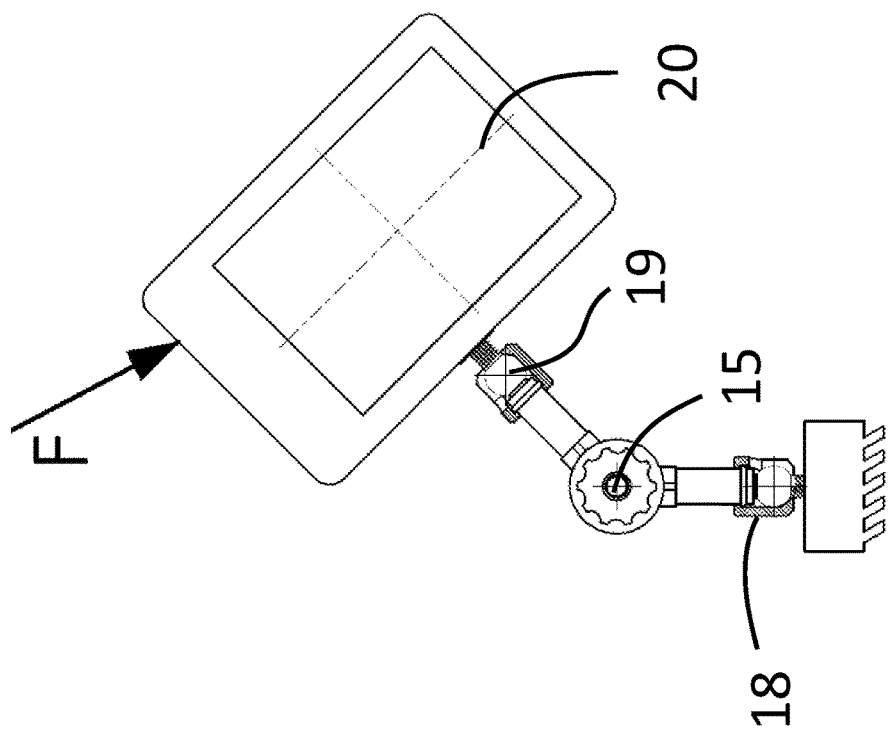
Figure 1B:
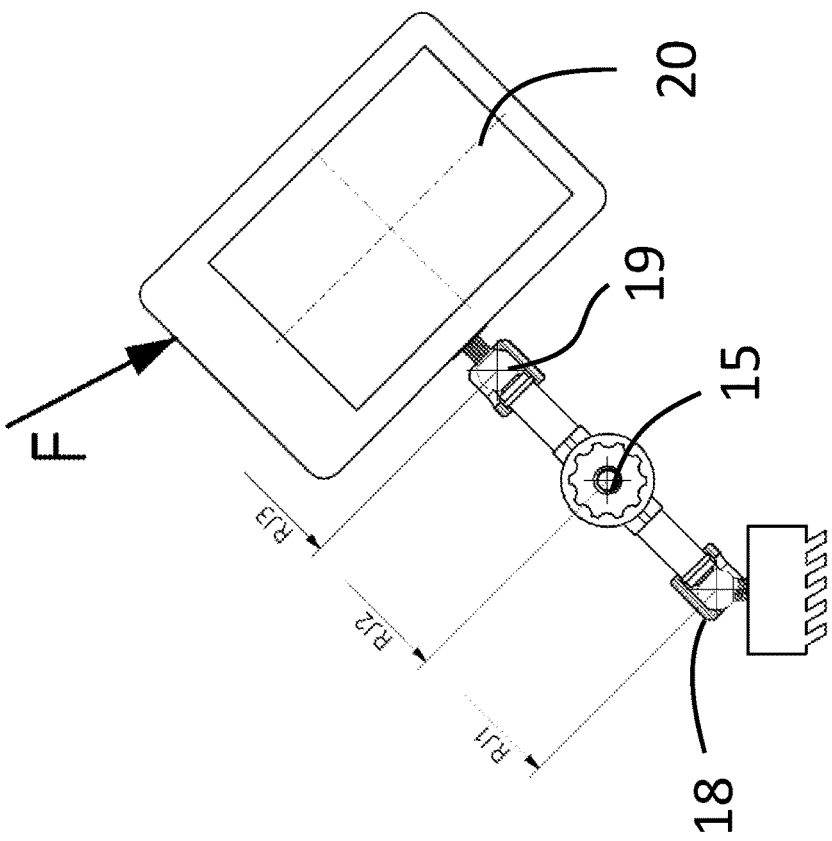
Figure 2:
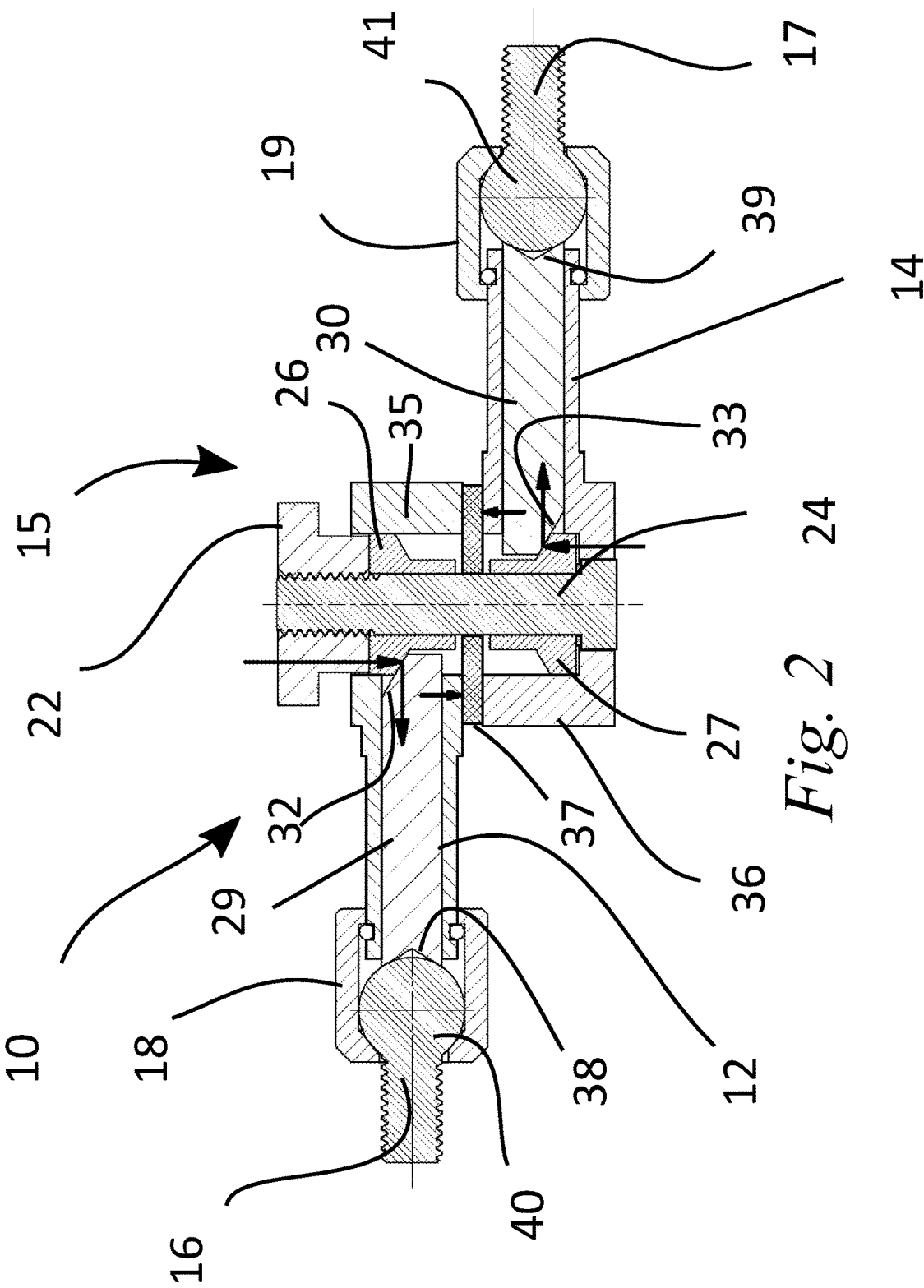
FIG. 2 is a sectional view of the known utility arm.
Figure 3:
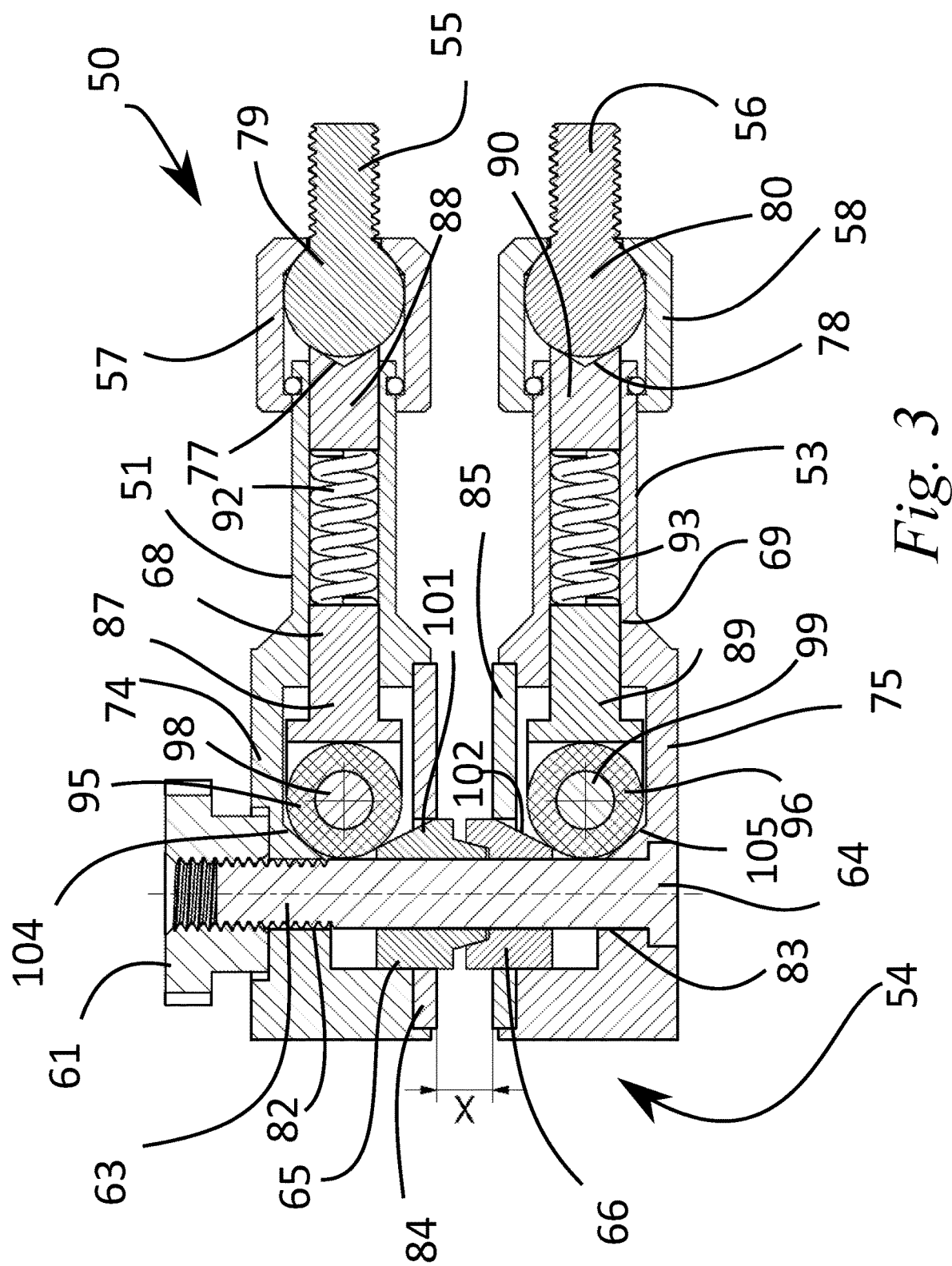
FIG. 3 is a sectional view of an embodiment of the new utility arm in an unlocked state.

Referring to FIG. 3, the utility arm comprises a first arm 51 and a second arm 53 which are pivotable about a pivoting joint 54. As for known utility arms, each arm 51, 53 may conveniently terminate with ball and socket joints 57, 58 having threaded attachment studs 55, 56, though of course some other termination could be provided.

The first arm 51 and second arm 53 are secured together by a central bolt 63 which runs through bores 82, 83 provided in the first arm 51 and second arm 53. The central bolt 63 terminates at its lower end with a thickened head 64, which engages with the arm housing 75 of the second arm 53. An operating knob 61 is attached to the upper end of the central bolt 63 with a thread. The lower surface of the operating knob 61 abuts the arm housing 74.

Figure 4:
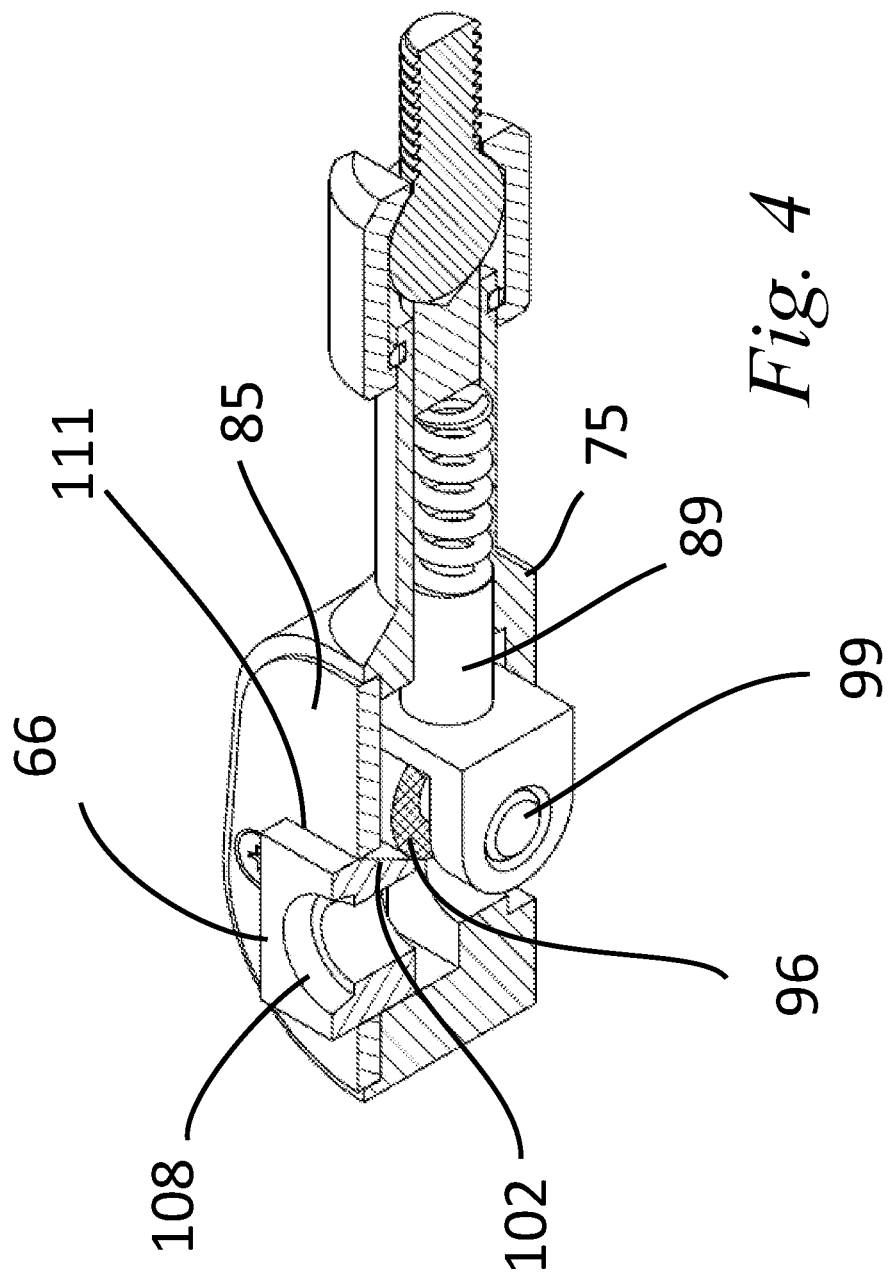
FIG. 4 is a sectional perspective view of part of the new utility arm.
Figure 5:
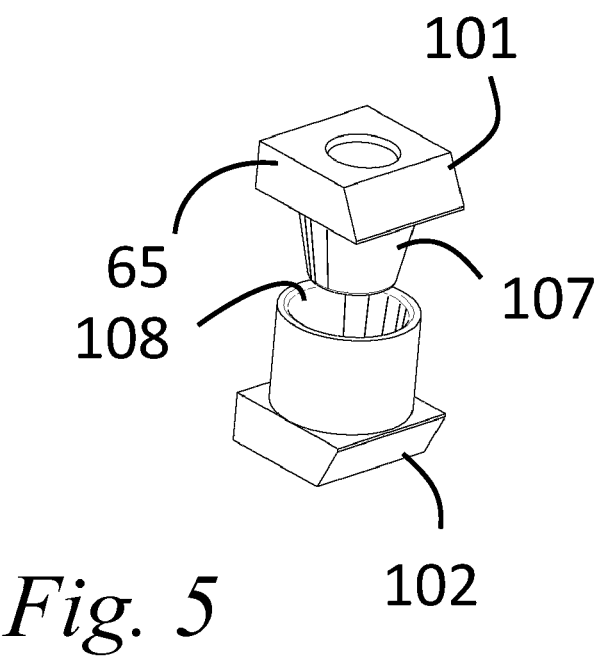
FIG. 5 is a perspective view of an alternative embodiment part of the new utility arm.

An upper pressure wedge 65 and lower pressure wedge 66 are mounted on the central bolt 63. Referring to FIGS. 4 and 5, the upper pressure wedge 65 has a frustoconical male surface 107 which engages with a corresponding frustoconical female surface 108. The upper pressure wedge is a unitary component. The upper pressure wedge 65 can slide inwards and outwards of the arm housing 74 through an aperture in an upper cover plate 84, the upper pressure wedge 65 and aperture in the upper cover plate 84 both having an corresponding square shape so that the upper pressure wedge 65 cannot rotate relative to the arm housing 74. Likewise, the lower pressure wedge 66 can slide inwards and outwards of the arm housing 75 through an aperture 111 in a lower cover plate 85, the lower pressure wedge 66 and aperture in the lower cover plate 85 both being square so as to prevent rotation of the lower pressure wedge 66 relative to the arm housing 75.

A first piston 68 extends along arm housing 74, and a second piston 69 extends along arm housing 75. Each piston is split, so that the first piston 68 has a roller bearing end 87 and a ball joint end 88 which are separated by a compression spring 92. The second piston 69 is similarly arranged, with a roller bearing end 89 separated from a ball joint end 90 by a compression spring 93. The compression springs may for example be coil springs, Belleville springs or other compression members known in the art.

The roller bearing end 87 of the first piston 68 has a roller 95 supported on a roller bearing 98. The upper pressure wedge 65 has an inclined surface 101 that bears against the roller 95. When the operating knob 61 is tightened, the arm housing 74 and arm housing 75 are drawn together, so that the upper pressure wedge 65 moves upwards relative to the arm housing 74. The inclined surface 101 of the upper pressure wedge 65 urges the roller 95 away from the central bolt 63, so that the first piston 68 is urged outwards towards the ball and socket joint 57. An inclined surface 104 on the upper inside surface of the arm housing 74 also bears on the roller 95 as the operating knob 61 is tightened during the initial tightening. The pressure wedges 65, 66 could alternatively be shaped as shown in FIG. 5.

Figure 6:
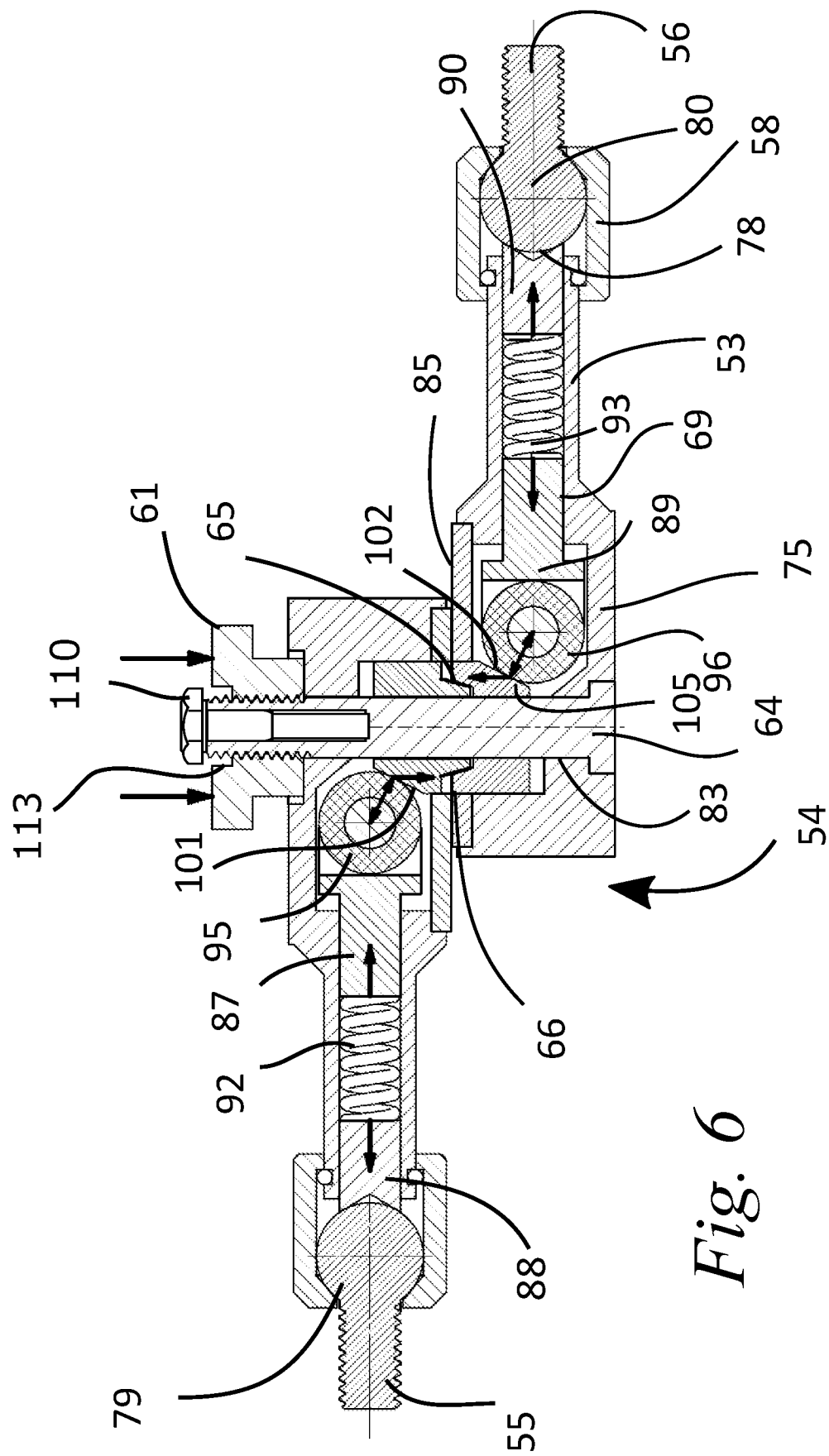
FIG. 6 is sectional view of the new utility arm in a locked state.

Referring to FIG. 6, as the operating knob 61 is progressively tightened, the inclined surface 101 of the upper pressure wedge 65 rides up the roller 95, and the force is transmitted through the compression spring 92 to the ball and socket joint 57. The ball and socket joint 57 is arranged generally as in the known manner, with the distal end of the first piston 68 having a conical notch 77 which bears against a ball 79; however, the force applied by tightening the operating knob 61 is now regulated by the compression spring 92, allowing an explicit variable and repeatable clamping force applied to be applied to the ball and socket joint 57, and the spring also applying a reactive force back to the pivoting joint 54.

Referring back to FIG. 3 and also to FIG. 4, the lower pressure wedge 66 and second piston 69 are arranged in a similar way to the upper pressure wedge 65 and first piston 68. Referring also to FIG. 4, the lower pressure wedge 66 has an inclined surface 102 facing downwards which abuts a roller 96 supported on a roller bearing 99 mounted on a roller bearing end 89 of the second piston 69. As the operating knob 61 is tightened, the lower pressure wedge 66 moves downwards relative to the arm housing 75, so that roller 96 rides up the inclined surface 102 of the lower pressure wedge 66 and is forced outwards away from the central bolt 63. An upward facing inclined surface 105 on the lower inside portion of the arm housing 75 also initially acts on the roller 96 as the arm housing 75 and lower pressure wedge 66 are drawn together. The roller bearing end 89 moves distally outwards, energising a compression spring 93 which in turn acts on ball joint end 90 of the second piston 69, so that a conical notch 78 presses against ball 80 to lock the ball and socket joint 58.

The line of contact between roller 95 and inclined surface 101 is perpendicular to the axis of the first piston 68; the force moves gradually along a plane rather than being concentrated along a line (and the same applies to the roller 96 of the second piston 69 and inclined surface 102 of the lower pressure wedge 66). This in conjunction with the use of a rolling element rather than a sliding contact makes the contact elements much less prone to wear. The inclined surfaces of the pressure wedges can be given low incline angles, allowing for finer adjustment and less sensitivity to wear.

Though the inclined surfaces are here shown as planer side of the pressure wedge, the area of the inclined surface could be more limited, and need not be planar, and the incline need not be constant. For example, the inclined surface could provide by a ramp occupying a notch or hollow in the surface of the parts here termed pressure wedges, with a ball bearing or other cam follower engaging with the inclined surface provided in the hollow instead of a roller illustrated in this embodiment.

It will be noted that in a fully unlocked state, the arm housing 74 and arm housing 75 are separated by a distance X. As the operating knob 61 is tightened, the arm housing 74 and arm housing 75 are drawn together, until in the fully locked state of the utility arm 50, the upper cover plate 84 of the arm housing 74 and the lower cover plate 85 of the arm housing 75 abut and there is no separation between the arm housing 74 and arm housing 75. This separation may be utilised by including some visually indication means on the utility arm 50 that allows a user to see the locking state. Further, as the upper pressure wedge 65 and lower pressure wedge 66 are urged together (via the reactive force from the compression springs 92, 93 and rollers 95, 96 respectively) with the tightening of the operating knob 61, the friction between the mating frustoconical surfaces of the pressure wedges 65, 66 increases and resists pivoting of the pivoting joint 54, so that the operating knob 61 may be tightened to a value between fully locked and fully unlocked, the resistance to pivoting (i.e. the torque resistance) being dependent on how closely the arm housing 74 and arm housing 75 have been drawn together by the operating knob 61. The clamping force is continuously variable between the maximum and minimum values, and the joint is fully locked when the maximum clamping force exists between the components. Since the value of the separation distance X is proportional to the degree of tightening of the operating knob 61 and the clamping force, and is predictable and repeatable, the user may adjust the joint to give a pre-selected desired degree of lock or resistance to the arm. In this, any indication, scale or legend provided may be used to help, and means may be included to indicate to the user, by sight or by feel, that such an intermediate point between the maximum and minimum clamping force has been arrived at.

When the operating knob 61 is fully tightened and the arm housing 74 and arm housing 75 have been drawn fully together, both the ball and socket joint 57 and ball and socket joint 58 are locked, and the pivoting joint 54 itself is locked.

FIG. 6 also shows a possible modification of the design, where a counter screw 110 engages with a threaded bore provided in the bolt shaft 63. The knob 61 is provided with a countersunk bore 113, which the head of the counter screw 110 abuts when the knob is displaced a set distance along the bolt shaft 63 (just beyond the point when the joint is fully unlocked), thereby preventing the knob 61 from being over loosened. This stops the joint being accidentally dismantled, and also stops the frustoconical surfaces 101, 102 from separating; since the frustoconical surfaces are in contact at all times, ingress of contaminants is prevented. The stop arrangement could be arranged in alternative ways, such as having the counterscrew extend outwards, or even arranging a counterscrew or other stop means on the other end of the shaft 64 or along the shaft's length.

By choosing the incline (and/or other characteristics, such as the surface area, material etc) of the mating frustoconical surfaces of the pressure wedges 65, 66, and the characteristics of the compression springs 92, 93 and the characteristics of the conical notches 77, 78 and the ball and socket joints 57, 58, the torque resistance of the first ball and socket joint 57, second ball and socket joint 58 and pivoting joint 54 for a particularly degree of actuation of the utility arm 50 as a whole can be chosen.

Advantageously, the utility arm 50 may be configured so that the operating knob 61 can be set to semi-actuate the utility arm 50—that is, to set the resistances of the first ball and socket joint 57, second ball and socket joint 58 and pivoting joint 54 to some point between being fully unlocked (having little resistance to any pivoting or rotational force) and fully locked (having a high resistance to any pivoting force).

Further, the torque resistance of the first ball and socket joint 57, second ball and socket joint 58 and pivoting joint 54 may be chosen to be unequal for a given degree of semi-actuation. If the torque resistance for each joint is chosen to be proportional to the distance from the payload, so that the torque resistance of the ball and socket joint 57 is greater than the torque resistance of the pivoting joint 54, which is in turn greater than the torque resistance of the ball and socket joint 58, a payload attached to the ball and socket joint 58 may be moved from point to point along a desired line within the hemisphere of reach, since each joint offers the same subjective torque resistance to a force applied at the payload point.

Figure 7:
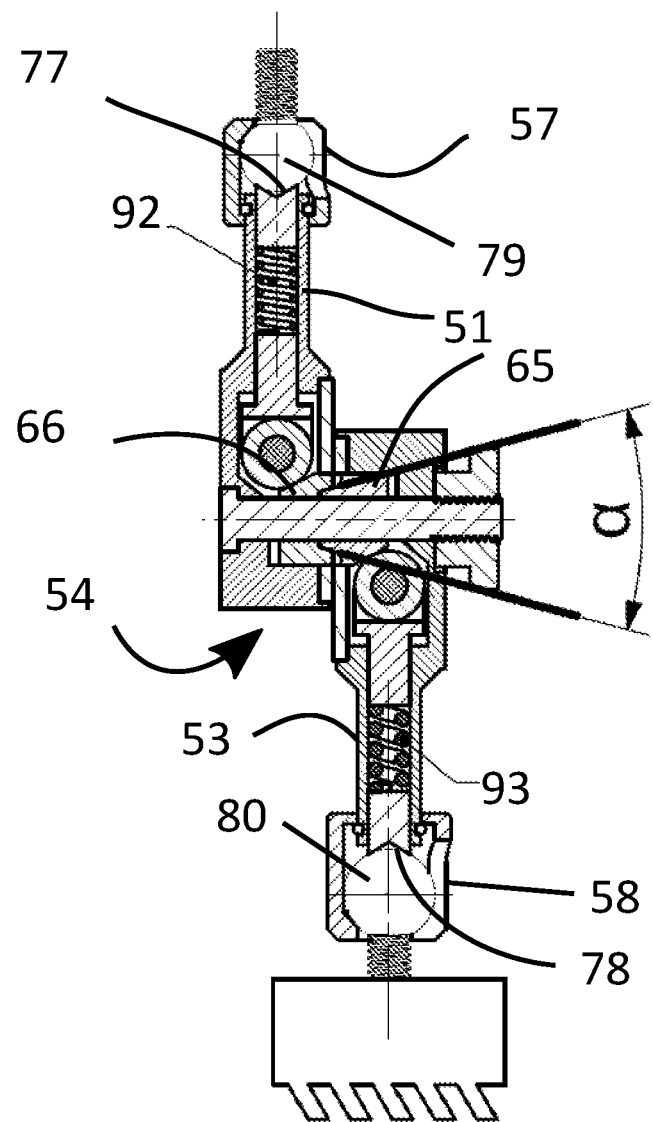
FIG. 7 is perspective view showing partial sections of the new utility arm in use.

Referring to FIG. 7, a number of factors affect the torque resistance of a joint, including the strengths of the compression spring 92 and/or compression spring 93, the radii of the ball 79 and/or ball 80 (and the geometry of the conical notch 77 and conical notch 78 respectively), and the cone angle of the frustoconical male surface and frustoconical female surface between the upper and lower pressure wedges 65, 66. Increasing the size of the ball 79 and ball 80 increases the respective torque resistance in those joints, as does increasing the spring strength in each arm 51, 53, The torque resistance of the pivoting joint 54 may is dependant (amongst other things) on the conical angle $\alpha$ between the two conical surfaces 108, 109 the upper pressure wedge 65 and lower pressure wedge 66 (the torque resistance being inversely proportional to the sine of angle $\alpha$, so that a more acute cone increases the torque resistance). Other factors, such as the length of the first arm 51 and second arm 53, and the material used for the components, will also affect the joints' torque resistance.

With the appropriate selection of ball diameter, spring dimension and cone angle an equal reaction movement in each joint may be provided independent of length of lever arm: Larger balls, heavier springs, and smaller (more acute) cone angle all result in higher torque resistance (the torque resistance of the cone clutch being inverse proportion to sin $\alpha$).

Figure 8:
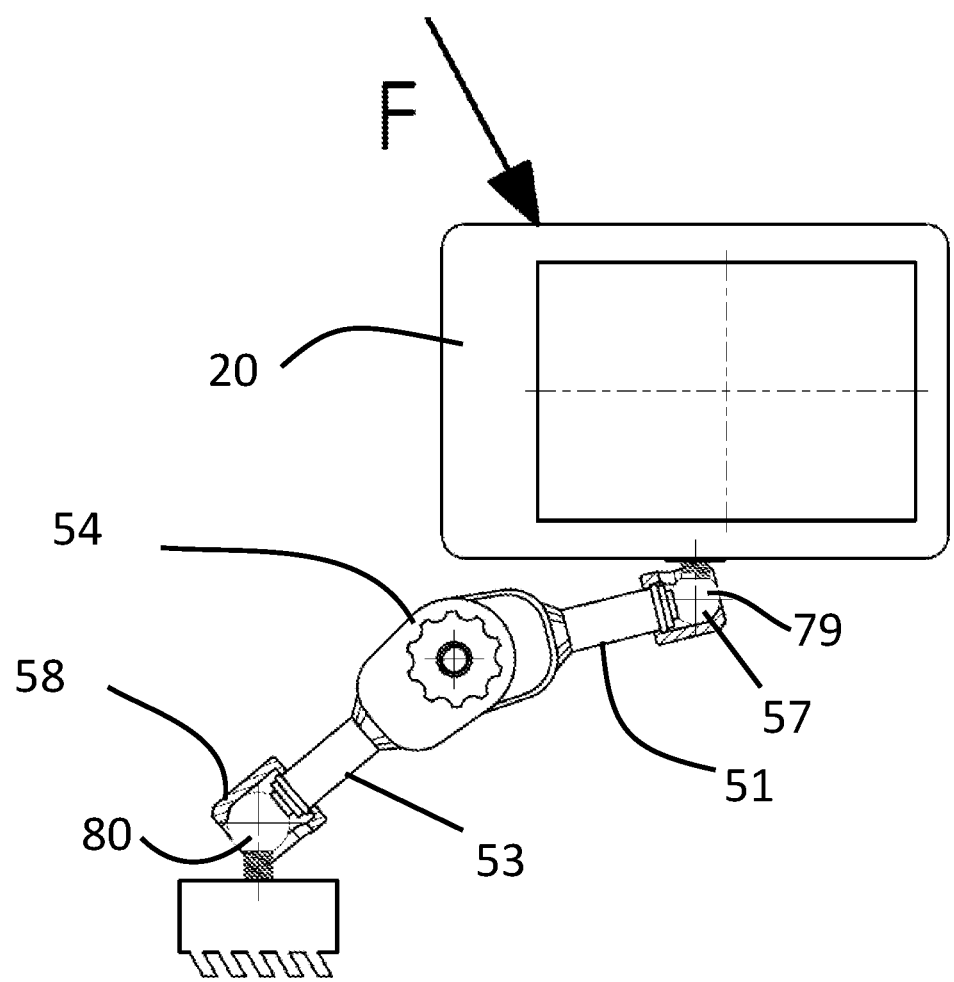
FIG. 8 is perspective view of the new utility arm in use.

Referring also to FIG. 8, the payload here is to be secured to ball 79 at the distal end of the first arm 51, while the second arm 53 is secured by ball 80 to an anchor point. Accordingly, the radius of the ball 79 is chosen to be smaller than the radius of the ball 80. Similarly, the compression spring 92 in the first arm 51 is chosen to be weaker than the compression spring 93 located in the second arm 53. The ratio of the torque resistance of the ball and socket joint 57 to the torque resistance of the ball and socket joint 58 is ideally close to the ratio of the distance between the payload and the ball and socket joint 58 to the distance between the payload and ball and socket joint 57. The torque resistance of the pivoting joint 54 is similarly chosen to have the same ratio to the ball and socket joint 57 and to the ball and socket joint 58 as the ratio of its reciprocal of its distance from the payload to the reciprocals of other joints' payload distance.

Again, ideally this relative torque resistance is particularly chosen to apply at a semi-actuation point that is just sufficient to support the weight of the payload, so that the payload will remain stationary when not deliberately moved, but when the user applies a force to move the payload the torque resistance of each joint is overcome to allow the payload to be moved in a free-floating manner, ideally with a single hand, the payload again being securely supported when the pressure from the user is removed. The utility arm can then be used allow a payload to be freely supported at different re-positioned points without having to adjust the operating knob 61. The joint may then be in a state between being fully locked and fully unlocked, where the arm position and configuration is spatially fixed unless a force (depending on the setting, this may be a relatively small force) is applied. The user may adjust the pivoting joint to vary the force necessary to overcome the clamping force; since the distance X is proportional to the clamping force, the user may note the particular distance or distances X that he finds most convenient, and reproduce them by adjusting the pivoting joint to a particular value of X. The user may be aided by a visual scale or other indicia that allows the value of distance X to be judged 7. Thus, the first joint is provided with a first torque resistance, the intermediate joint has a second torque resistance, and the second joint has a third torque resistance, the ratio of the first, second and third torque resistances being substantially in proportional to the ratio of the distances from the payload.

Although a knob 61 is shown here, the joint could equally be controlled by a lever turning the thread.

The invention claimed is:

1. A utility arm comprising:
   a first arm, terminating in a first universal joint, locked by a first piston;
   a second arm, terminating in a second universal joint, locked by a second piston;
   an intermediate joint positioned between the first universal joint and the second universal joint;
   a locking means on the intermediate joint;
   wherein the intermediate joint includes:
      a first housing, with a first pressure piece having an inclined surface which abuts the first piston, the first pressure piece also having a frustoconical surface;
      a second housing, with a second pressure piece having an inclined surface which abuts
   the second piston, the second pressure piece also having a frustoconical surface;
   the first pressure piece interlocking with the frustoconical surface of the second pressure piece and the second pressure piece interlocking with the frustoconical surface of the first pressure piece, so that pressure exerted by the locking means presses the first pressure piece and second pressure piece together, such that the inclined surface of the first pressure piece acts on the first piston to lock the first universal joint, the inclined surface of the second pressure piece acts on the second piston to lock the second universal joint, and the locking means lock the intermediate joint.

2. A utility arm according to claim 1 wherein the first pressure piece is a unitary component.

3. A utility arm according to claim 1 wherein the first piston includes a roller which abuts the inclined surface of the first pressure piece.

4. A utility arm according to claim 3 wherein the second piston includes a roller which abuts the inclined surface of the second pressure piece.

5. A utility arm according to claim 1 wherein the first housing and the second housing are spaced apart when the intermediate joint is unlocked, and move towards each other when the intermediate joint is locked to give a visual indication of whether the intermediate joint is in the locked or unlocked state.

6. A utility arm according to claim 1 wherein at least one of the pistons includes a resilient compression member.

* * * * *